United States Patent [19]

Ehrlich et al.

[11] Patent Number: 5,444,583
[45] Date of Patent: Aug. 22, 1995

[54] DISK DRIVE HAVING ON-BOARD TRIGGERED DIGITAL SAMPLING ANALYZER

[75] Inventors: Richard M. Ehrlich, Santa Clara; James V. Wiseman, Palo Alto, both of Calif.

[73] Assignee: Quantum Corporation, Milpitas, Calif.

[21] Appl. No.: 327,443

[22] Filed: Oct. 21, 1994

Related U.S. Application Data

[63] Continuation of Ser. No. 954,557, Sep. 30, 1992, abandoned.

[51] Int. Cl.$^6$ ............................................. G11B 5/596
[52] U.S. Cl. ................................... 360/78.09; 360/69; 324/226
[58] Field of Search .................... 360/78.04, 78.09, 69, 360/77.04; 324/226, 262

[56] References Cited

U.S. PATENT DOCUMENTS

| | | | |
|---|---|---|---|
| 3,881,184 | 4/1975 | Koepcke et al. | 369/32 |
| 4,524,398 | 6/1985 | Fujiki | 360/78.14 X |
| 4,628,379 | 12/1986 | Andrews, Jr. et al. | 360/77.05 |
| 4,679,103 | 7/1987 | Workman | 360/78.14 X |
| 4,914,644 | 4/1990 | Chen et al. | 360/78.04 X |
| 4,972,138 | 12/1990 | Bush | 324/73.1 |
| 4,979,055 | 12/1990 | Squires | 360/69 |
| 5,005,089 | 4/1991 | Thanos et al. | 360/77.08 |

OTHER PUBLICATIONS

Harman et al. "The Motorolla MC68000 . . . " ©1985, pp. 84–87.

Wen-Wei Chiang, "Multirate State-Space Digital Controller For Servo Sector Systems" *IEEE Proc. 29th Conf. on Decision & Control*, Honolulu, Hi. Dec. 1990, pp. 1902–1907.

*Primary Examiner*—Aristotelis Psitos
*Assistant Examiner*—James T. Wilson
*Attorney, Agent, or Firm*—David B. Harrison

[57] ABSTRACT

A disk drive includes an on-board digital sampling analyzer. The drive has a data storage disk spinning at a predetermined velocity, a data transducer head for reading information recorded on a storage surface of the storage disk, an electromechanical actuator mechanism for positioning the data transducer head relative to the disk, a digital actuator controller means for controlling the actuator mechanism within a closed loop head positioner servo and having internal registers at addressable locations, a memory for storing information read from the disk and for storing at least one trace record, and a memory controller for controlling addressing of the memory. A trace taking process and structure reads at least one of the internal digital registers of the actuator controller during a sampling interval and records a resultant trace value within the trace record of the memory. An on-board analyzer process retrieves and processes the trace record into a correction. The correction is then provided by the analyzer to adjust operation of the actuator controller.

10 Claims, 9 Drawing Sheets

DISK DRIVE HAVING ON-BOARD TRIGGERED DIGITAL SAMPLING ANALYZER

REFERENCE TO RELATED APPLICATION

This is a continuation of U.S. patent application Ser. No. 07/954,557, filed on Sep. 30, 1992, now abandoned.

FIELD OF THE INVENTION

The present invention relates to a disk drive head positioner architecture. More particularly, the present invention relates to a disk drive including a digital head positioner having an on-board digital analyzer for aiding calibration and diagnosis of head positioner operations.

BACKGROUND OF THE INVENTION

It is known to collect selected drive performance data, such as data relating to repeatable positional errors synchronized to disk spindle rotation and to develop correctional values and apply those values within a head position servo loop of a disk drive. One such approach is described in U.S. Pat. No. 4,628,379 to Andrews, Jr., et al, and entitled "Disk Runout Compensator". The Andrews Jr., et al. approach called for averaging offsets of thirty two embedded servo sectors over eight revolutions in order to develop average values during a calibration routine executed by a microcontroller. Magnitudes of quadrature sinewaves were determined using the sum of the averages of the real vectors and the sum of the averages of the imaginary vectors for each sector location. A vector sum was then calculated in real time and applied by the microcontroller through a digital to analog converter to an analog summing junction of the head positioner servo loop. Head position information was combined with the vector sum at the analog summing junction and then passed through an analog loop compensation network before being amplified and applied as a control current to a linear head position actuator.

U.S. Pat. No. 3,881,184 to Koepcke et al., entitled "Adaptive Digital Servo System", describes a digital servo loop employing 64 embedded optical position samples per revolution. These samples resulted in digital information from which a fundamental or higher order harmonics were developed synchronous to the spindle motion. A discrete Fourier transform analysis was then applied to develop correction signals which were then applied to reduce the runout.

A further approach of the prior art has been to collect trace records of disk drives in conjunction with external logic analyzer circuitry, and then analyze the trace records to understand and characterize drive performance. These techniques have typically been employed during disk drive development or maintenance, and have not lent themselves to real-time adaptation of disk drive characteristics. While these prior approaches are representative of the prior art, they lack certain flexibility and programmability. In particular, the synchronous runout correction circuits were dedicated to that task alone, rather than being multitasked or adaptable under program control to other tasks and measurements.

Accordingly, a hitherto unsolved need has arisen for a disk drive having a fully contained on-board digital analyzer capable of taking a wide variety of programmable trace records and creating a wide variety of stimuli and responses within the head positioner servo loop without requiring external equipment or connections.

SUMMARY OF THE INVENTION WITH OBJECTS

A general object of the invention is to provide a disk drive head positioner servo loop with an on-board programmed digital logic analyzer in a manner which overcomes limitations and drawbacks of the prior art.

Another general object of the invention is to provide an integrated, on-board disk drive digital logic analyzer as an active part of a servo control loop for a voice coil positioner.

Yet another general object of the present invention is to implement a logic analyzer function within control software of a multi-tasked digital head position controller architecture of a disk drive.

A more specific object of the present invention is to provide a disk drive digital sampled servo positioner loop with a trace taking capability for taking trace records of multiple variables, e.g. four selectable variables, at each servo control interval.

Yet another specific object of the present invention is to provide a mechanism for accessing selected control variables of a head position digital servo control loop on the basis of predetermined trigger events.

One more specific object of the present invention is to provide background control program analysis processes for analyzing trace records collected at servo control intervals when a microcontroller is not occupied by real time servo control activities.

Yet another specific object of the present invention is to improve the overall performance of a disk drive head positioner servo loop architecture by automatically measuring and correcting for a plurality of tolerances and variations within each drive.

Yet one more specific object of the present invention is to provide a logic analyzer function within a disk drive employing an embedded sector servo pattern and a digital sampling multi-rate head position controller architecture including a state-space estimator function.

In accordance with principles of the present invention a disk drive includes an on-board digital sampling analyzer. The drive has a data storage disk spinning at a predetermined velocity, a data transducer head for reading information recorded on a storage surface of the storage disk, an electromechanical actuator mechanism for positioning the data transducer head relative to the disk, a digital actuator controller means for controlling the actuator mechanism within a closed loop head positioner servo and having internal registers at addressable locations, a memory for storing information read from the disk and for storing at least one trace record, and a memory controller for controlling addressing of the memory. A trace taking process and structure reads at least one of the internal digital registers of the actuator controller during a sampling interval and records a resultant trace value within the trace record of the memory. An on-board analyzer process retrieves and processes the trace record into a correction. The correction is then provided by the analyzer to adjust operation of the actuator controller.

In accordance with further principles of the present invention, a disk drive head position servoing method is provided in which a servo process generates feedback estimates and puts out head position correction values during discrete control intervals occurring during a revolution of a data storage disk. The head position correction values are based at least in part upon the estimates and are applied to reposition an electromechanical head positioner. The head position correction values are further based upon a difference between a commanded positional value and a measured positional value. Each control interval includes a real-time head position control increment and a background increment following completion of the real-time increment. An improved drive calibration method comprises during the real-time increment the steps of:

taking a trace of at least one predetermined parameter, recording the trace as part of a trace record in a drive memory, and combining at least one performance correction parameter as a feed-forward value with the head position correction value generated during the real-time increment to produce a corrected head position correction value and applying it to reposition the electromechanical head positioner.

The method comprises during the background increment the steps of:

retrieving the trace record from the memory, analyzing the trace record in accordance with predetermined criteria, and generating the performance correction parameter and providing it for feed-forward use to the servo process occurring during the real-time increment.

As one aspect of the present invention, the method during the real-time increment includes the further step injecting an excitation value into the servo process. During the background increment the method includes the additional steps of:

generating the excitation value, analyzing the trace record taken during injection of the excitation value to determine the servo process response thereto, and generating the performance correction parameter therefrom.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
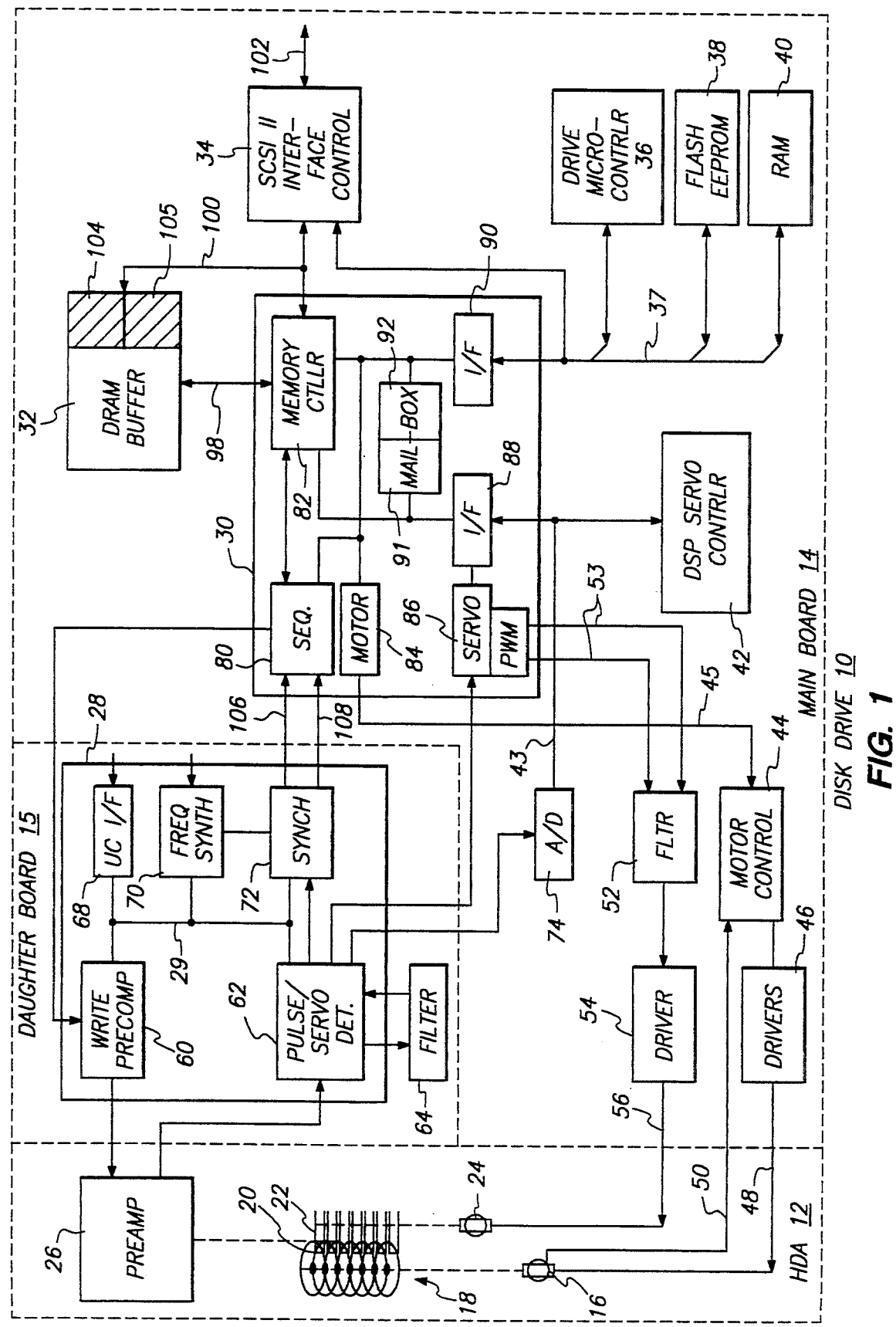
FIG. 1 is a detailed electrical block diagram of a disk drive incorporating principles of the present invention.

FIG. 1 provides a summary view of a presently preferred electrical architecture of a disk drive 10 in accordance with principles of the present invention. Therein, a head and disk assembly is mounted to a base (not shown) and enclosed by a cover (not shown) in order to define an enclosed and sealed space as is conventional with Winchester disk drives. Structural details of a presently preferred head and disk assembly 10 are given in the example provided by copending, commonly assigned U.S. patent application Ser. No. 07/881,678 filed on May 12, 1992, for "Hard Disk Drive Architecture", now U.S. Pat. No. ; and a dual cover arrangement for reducing acoustic noise is given for example in copending, commonly assigned U.S. patent application Ser. No. 07/824,031 filed on Jan. 11, 1992, for "Disk Drive with Reduced Acoustic Noise", the disclosures thereof being hereby incorporated herein by reference.

As illustrated diagramatically in FIG. 1, the drive 10 includes a spindle motor 16, a disk stack 18 of e.g. 7 data storage disks mounted on a spindle rotated by the spindle motor at a constant velocity, e.g. 4500 RPM. A data transducer head 20 for each disk surface is positioned by a head stack assembly 22 which is in turn positioned by a mass-balanced rotary voice coil actuator 24 including a flat actuator coil disposed for relative movement in a gap containing an intense magnetic field provided by permanent magnets. A preamplifier 26 is mounted on a flex circuit secured to the actuator 24 and contains electrical read preamplifier circuitry, head select circuitry and write driver circuitry. A type VM312H 14-channel, high performance thin-film head read/write preamplifier circuit, made by VTC Inc, or equivalent, is preferred for the preamplifier 26.

With seven 3.5 inch diameter disks 18, all of which contain user data and servo overhead data embedded in 64 servo sectors 110, and with a series of data track zones 112 having data transfer rates tailored to disk radius, e.g. 1225 Megabytes of user data or more, may be stored. In a one-inch high three disk embodiment, 525 Megabytes or more may be stored and retrieved. Each storage surface defines e.g. 2448 or more concentric data storage tracks, arranged e.g. in 16 zones. Within the zones, the maximum linear density is approximately 37,900 flux changes per inch. With 1,7 RLL encoding and a track density of 2670 tracks per inch, a recording density of e.g. 50,500 bits per inch is achieved.

Figure 2:
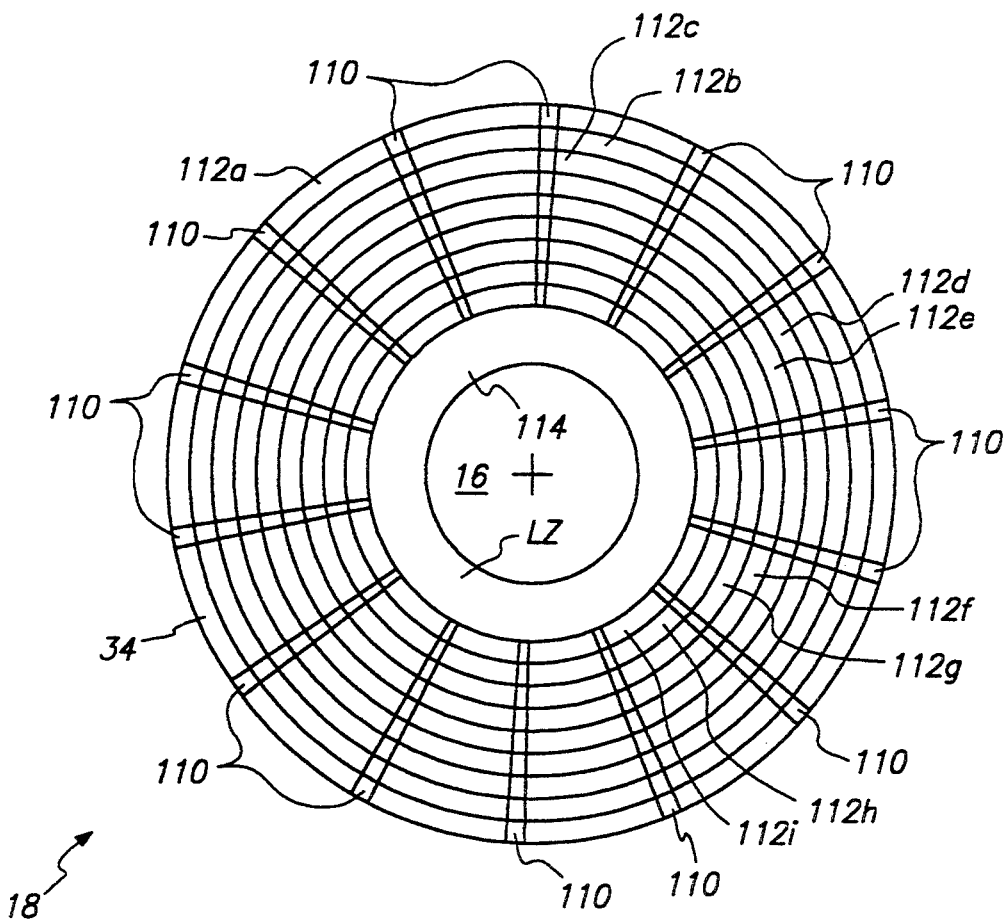
FIG. 2 is a simplified recording plan diagram of a data storage disk included within the FIG. 1 disk drive.
Figure 3:
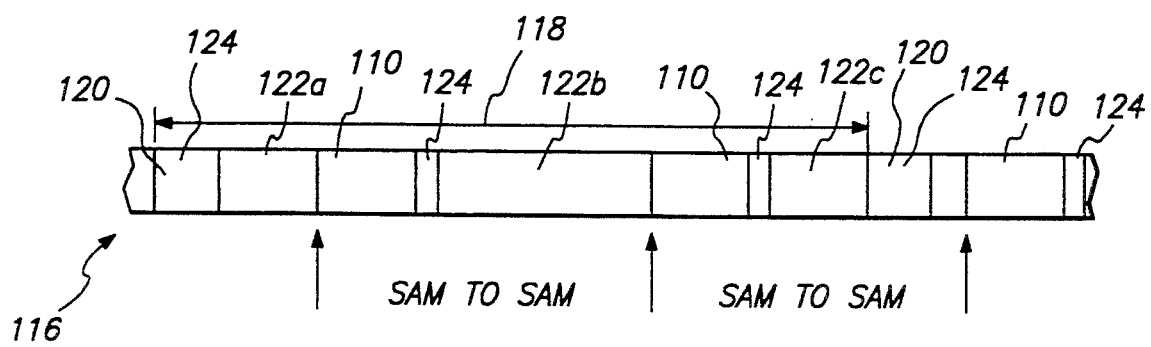
FIG. 3 is a linearized graph of a small segment of one concentric data storage track of a multiplicity thereof defined on the FIG. 2 data storage surface, illustrating timing relationships between servo sectors.
Figure 4:
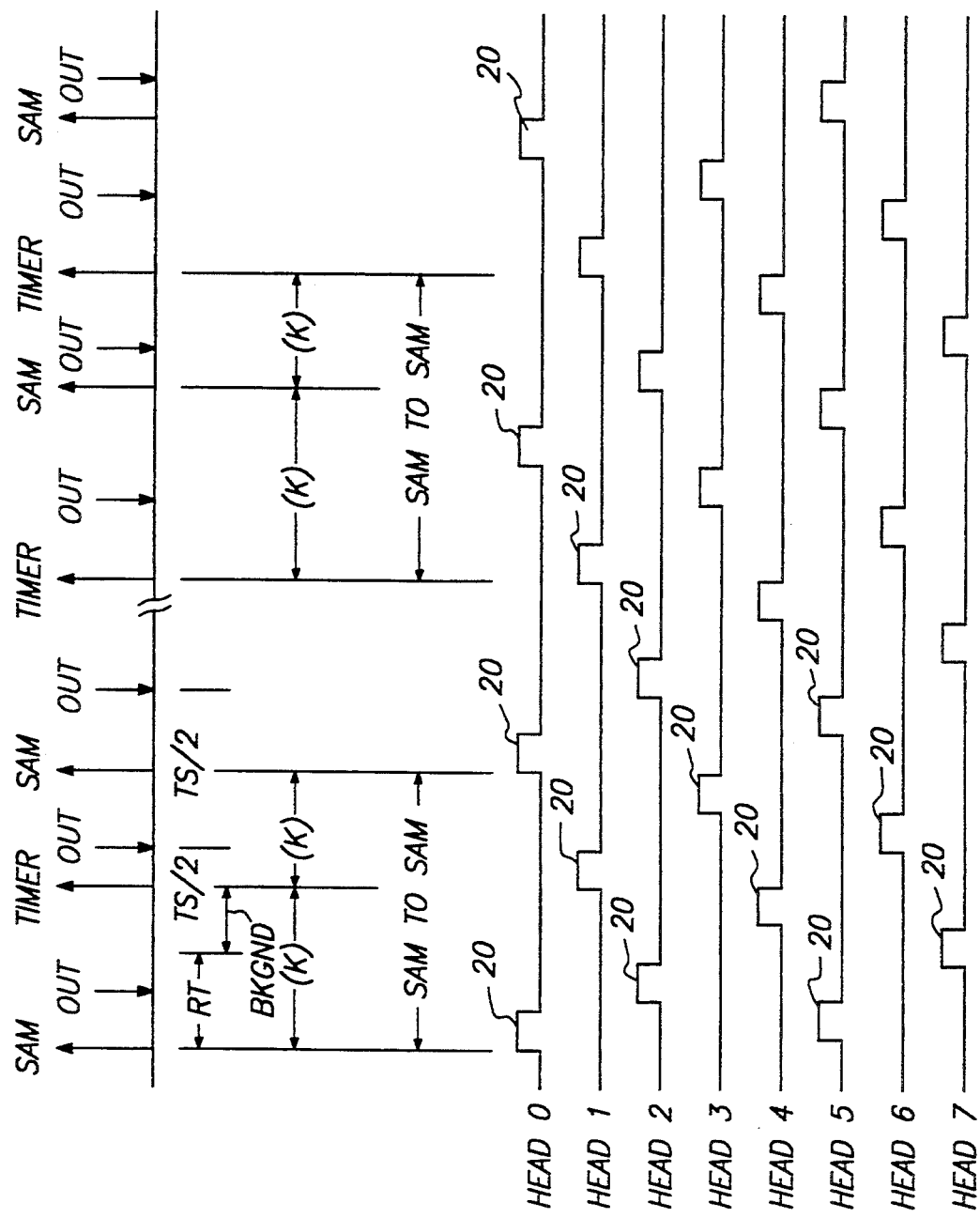
FIG. 4 is a series of timing diagrams related to a skew pattern followed from disk surface to disk surface within the FIG. 1 disk drive.

As shown in FIGS. 2 and 3, each circular data track 116 includes a number of user data sectors which are split up into segments by the 64 regularly spaced servo sectors 110. Each data surface includes its own prerecorded servo sectors 110, and each servo sector pattern of one storage surface is staggered relative to a servo sector pattern on adjacent other surfaces, as shown in FIG. 4. Given 64 sectors per revolution and a disk speed of 4500 RPM, the positional sampling rate of the servo control loop is 4.8 KHz. With a two-to-one multi-rate servo control process being carried out within each servo sector to servo sector interval (hereinafter referred to as "SAM-to-SAM"), head selects from one surface to the next may be carried out without missing a servo sector or otherwise degrading the performance of the multi-rate servo controller.

A preferred embedded sector servo pattern and method for obtaining a track position value relative to a centerline of each selected data storage track is described in copending, commonly assigned U.S. patent application Ser. No. 07/569,065 filed on Aug. 17, 1990 and entitled: "Edge Servo for Disk Drive Head Positioner" now U.S. Pat. No. 5,170,249; and a method and apparatus for decoding track position values read from the embedded servo sectors is described in copending, commonly assigned U.S. patent application Ser. No. 07/710,172 filed on Jun. 4, 1991 and entitled: "Asynchronous Data Reader for Embedded Sector Servo Disk Drive" the respective disclosures thereof being incorporated herein by reference.

The balance of the control electronics for the disk 10 is included on two printed circuit boards: a main board 14 and a daughter board 15 nested between the HDA 12 and the main board 14. The daughter board 15 includes an analog read/write integrated circuit 28, such as a type DP8492 Integrated Read Channel made by National Semiconductor, or equivalent. The circuit 28 includes a write precomp circuit 60, a pulse/servo peak detector 62, and an outboard digital filter 64, such as type 32F8012 programmable electronic filter made by SSI, or equivalent. The circuit 28 further includes a microcontroller interface 68 for receiving control values from the microcontroller 36, a frequency synthesizer for generating a plurality of frequencies each related to a selected particular data zone, and a data synchronizer which synchronizes and puts out a read clock and a raw data stream over paths 106 and 108. An internal bus structure 29 interconnects the circuit elements of the read/write integrated circuit 28.

The main printed circuit board 14 includes a drive control ASIC 30, a DRAM buffer 32, a SCSI II interface control circuit 34, the microcontroller 36 and associated micro address and data (MAD) bus 37 which also connects to a flash EEPROM 38 and to a random access memory array 40. The microprocessor is preferably an NEC type 78322 single-chip microprocessor; the EEPROM 38 is a type 28F512A 64k by 8 array, and the RAM 40 is preferably a BR6264A 8K by 8 CMOS SRAM part.

A servo control digital signal processor ("DSP") 42 connects to the drive control ASIC via its own address, data and control bus structure 43 which also extends to a discrete analog to digital converter 74. The converter 74 receives and quantizes e.g. servo pulse peak amplitude values from pulse servo detector 62. The DSP 42 is preferably a type TMS320C25 digital signal processor made by Texas Instruments, or equivalent. The analog to digital converter 74 is preferably a type MAX 154 8-bit A/D converter made by Maxim, or equivalent.

A motor control circuit 44 receives motor control signals from the drive control ASIC via a control line 45 and supplies three-phase driving signals to a spindle motor drivers circuit 46 which puts out phased driving currents to the three-phase windings of the spindle motor 16. Hall position sensors in the spindle motor 16 generate commutation control values which are fed back to the motor control circuit 44 over a feedback control path 50. One presently preferred example of a spindle motor driver circuit which reduces acoustic noise at the 4500 RPM spindle rate is described in copending, commonly assigned U.S. patent application Ser. No. 07/847,147 filed on Feb. 27, 1992, now U.S. Pat. No. 5,210,474, and entitled: "Digital-Analog Driver for Brushless D.C. Spindle Motor", the disclosure thereof being hereby incorporated herein by reference.

The drive control ASIC 30 also puts out two five bit pulse width modulated servo control signals via two PWMS to a servo signal low pass filter 52 over a control path 53. The filter 52 converts the control signals into a high resolution (10 bit resolution) analog value and supplies the value to an actuator driver circuit 54 which develops and puts out a driving current to the rotary actuator coil 24 over a path 56.

The digital control ASIC 30 includes a data sequencer 80 which is preferably substantially in accordance with the sequencer described in copending, commonly assigned U.S. patent application Ser. No. 07/710,861 filed on Jun. 4, 1991 and entitled: "Miniature Disk Drive Having Embedded Sector Servo With Split Data Fields and Automatic On-The-Fly Data Block Sequencing". The sequencer includes a fault tolerant 1,7 RLL address mark decoder circuit substantially in accordance with the description found in copending, commonly assigned U.S. patent application Ser. No. 07/710,065 filed on Jun. 4, 1991, now U.S. Pat. No. 5,231,545 and entitled: "Fault Tolerant RLL Data Sector Address Mark Decoder". The sequencer 80 further includes an on-the-fly error correction circuit in accordance with the teachings found in copending, commonly assigned U.S. patent application Ser. No. 07/650,791 filed on Feb. 1, 1991, now U.S. Pat. No. 5,241,546 and entitled: "On-The-Fly Error Correction with Embedded Digital Controller"; and copending, commonly assigned U.S. patent application Ser. No. 07/820,283 filed on Jan. 9, 1992, and entitled: "Crosschecking for On-The-Fly Reed Solomon Error Correction Code". The disclosures of the patent applications referred to in this paragraph are hereby incorporated herein by reference.

The drive control ASIC 30 further includes a memory controller 82 for controlling and refreshing the DRAM buffer 32. The memory controller 82, as well as the SCSI II interface 34, is substantially in accordance with a dynamic memory controller described in copending, commonly assigned U.S. patent application Ser. No. 07/762,683 filed on Sep. 19, 1991, and entitled: "Low Profile, High Capacity Micro-Winchester Disk Drive", the disclosure thereof being hereby incorporated herein by reference. A spindle motor control circuit 84 monitors spindle timing of the spindle motor and provides control signal on the path 45. A servo decoder circuit 86 decodes embedded servo information and sets up timing for reading centerline burst patterns in each servo sector. The servo decoder circuit 86 is substantially in accordance with U.S. patent application Ser. No. 07/710,172 referred to above. An interface 88 is provided for the servo DSP 42 bus 43, and an interface 90 is provided for the MAD bus 37. A mailbox register pair 91 and 92 enables the microcontroller 36 and the servo DSP 42 to communicate with one another. All communications between the microcontroller 36 and the servo DSP are carried out via the mailbox register pair 91, 92 or by access to a shared buffer space 104 defined within the DRAM buffer 32. An internal bus structure within the drive control ASIC enables the DSP 42 and the microcontroller 36 to define their respective access channels into the buffer 104.

Two servo address registers SARLO and SARHI, respectively containing the lower eight bits and the upper seven bits of address are provided in the control ASIC 30 for use by the DSP 42. When the DSP writes to these registers, four bytes will be fetched from the DRAM 32, starting at the written address. At the end of the fetch, these registers point to the word address immediately following the last word retrieved. The most significant bit of the upper register provides a status flag during read operations. This flag becomes true when a buffer memory access operation by the DSP is underway. When the DSP-buffer cycle of four bytes is completed, the status flag is cleared.

The DSP DMA channel to the buffer has address space for 32K words of the buffer 32. The microcontroller 36 has direct access to all 256K words of the buffer. The DSP address hardware maps the address written to the servo address registers into the uppermost 4K words of each 32K page of the 256K DRAM 32. This mapping procedure enables the DSP to have direct access to each page of the DRAM linearly and without address computations being required. Additionally, this approach protects the lower 28K word space of each memory page for use by the microcontroller 36 in order to buffer data block transfers between the host and the disk surfaces. The DSP also has direct access to four data registers located within the control ASIC 30. When a special address register is written by the DSP, the contents of the four registers are automatically transferred to four sequential storage locations of the DRAM buffer 32. These register locations of the ASIC 30 are located in the external data space of the DSP 42.

DSP-MICROCONTROLLER COMMUNICATIONS

The DSP 42 uses the buffer DRAM 32 for three major purposes: 1) in order to communicate with the microcontroller 36, and for this purpose there are four 16 bit words with which the two processors communicate; 2) in order to obtain some of the calibration and seek tables which are needed by the DSP 42 in carrying out its primary servo tasks; and 3) in order to store the results of traces which are taken during real time operations of the drive 10 and which are stored in a circular buffer 105 contained within the shared space 104 of the DRAM array 32.

As the head position servo loop implemented within the drive employs a two-to-one multirate estimator, servo control intervals occur at twice the frequency of servo sectors, e.g. a period of about 104 microseconds. At the beginning of each control interval, the servo DSP 42 is executing real-time servo control code, and is unavailable for communications with the drive microcontroller. Accordingly, the servo DSP 42 monitors its mailbox from the microcontroller 36 by a polling process as part of each control interval process. On the other hand, attention of the microcontroller 36 is obtained by writing a control flag bit in its mailbox which thereupon automatically initiates an interrupt.

The microcontroller 36 may write into the mailbox MMFLAG 92 by changing bits MB0, MB1, MB2 and MB6. By writing a "1" to bit MB6, a corresponding bit is set in the DSP mailbox and is detected by the DSP during the next poll. This bit is cleared when the DSP writes any value to its flag clear register.

All command/data locations are contained in e.g. the four lowest word locations of the buffer DRAM 32 in accordance with the following table:

| Loc. | R/W Command | Seek-Command | Extended Command |
|---|---|---|---|
| 0000 | CMD_POINTER | CYL_NUMBER | COMMAND |
| 0002 | WRITE_DATA | HEAD_NUMBER | Argument #1 |
| 0004 | READ_DATA | | Argument #2 |
| 0006 | READ_ECHO | | Argument #3 |

The microcontroller 36 can use the mailbox MMFLAG 92 and some or all of the bottom four words of the DRAM buffer 104 to request any one of eight DSP operations. The values MB0-2 of the microcontroller to DSP mailbox 91 comprise eight commands. A 0 commands execution of an extended command. A 1 commands a write to the DSP's data space [RW DATA→DATA(CMD POINTER)]. A 2 commands a write to the DSP's program space [WR DATA→PROGRAM(CMD POINTER)]. A 3 commands a write to the DSP's I/O space[RW DATA→I/O(CMD POINTER)]. A 4 commands a read from the DSP's data space [DATA(CMD POINTER)→RW DATA]. A 5 commands a read from the DSP's program space [PROGRAM(CMD POINTER)→RW DATA]. A 6 commands a read from the DSP's I/O space [I/O(CMD POINTER)→RW DATA]. A 7 commands starting a track seeking operation{SEEK to CYL NUMBER/HEAD NUMBER].

If, for example, the microcontroller 36 wants to write the value 1234H into the DSP's DATA-memory location 0056H, then it must first write the value of the desired location 0056H into the buffer DRAM location CMD POINTER (000H), and the desired data value 1234H into the buffer DRAM location WRITE DATA (0002H). The microcontroller 36 then writes the value 01000001B into the microcontroller to DSP flag register 92 (MMFLAG). The value 01000001B is the logical OR of WR DATA (001B) and the value 01000000, which sets MB6 of the MMFLAG register 92, thereby signalling the DSP 42 that a valid command is now present in the DSP's mailbox register SMFLAG 91. The microcontroller 36 then waits until the DSP clears MB6 of register 92 (by writing to its SMFCLR register before starting any other read or write operation.

If the microcontroller 36 desires to read the value contained in the DSP's PROGRAM-memory location 9ABCH, then it must write 9ABCH into CMD POINTER (000H) and 01000101B into the MMFLAG register 92. The DSP 42 then polls its corresponding register SMFLAG 91, reads the values and writes the value in its program space at 9ABCH into the READ DATA space (0004H) of the buffer DRAM. The DSP 42 then clears MB6 of the MMFLAG 92 (as by writing to its SMFCLR register). The microcontroller 36 may then get the desired DSP program space value from the buffer 104 by reading location READ DATA (0004H). The buffer location READ ECHO will contain a copy of whatever was in the WRITE DATA location at the time of receipt of the RD DATA command. The microcontroller may then use this condition to obtain an "echo" of the RD DATA command.

In order to request the servo loop to seek to a new track location, the microcontroller 36 must first write the desired head number and the cylinder number into the buffer locations HEAD NUMBER (0002H) and CYL NUMBER (0000H). It will then write the value 01000111B into the MMFLAG register 92. The DSP 42 will then clear MB6 of register 92 after it has received the seek command and before the seeking operation is completed. Seek complete will be affirmatively signalled back to the microcontroller 36 by the DSP 42 when the requested seeking operation has been finished and the selected head is over the target data track location.

While the controller master-DSP slave mode of operation relies upon polling by the DSP 42 of its SMFLAG register 91, a DSP master-controller slave mode of operation relies upon interrupting the microcontroller in order to pass time-critical messages. In order to pass a message to the microcontroller 36, the DSP must first write a three-bit code to bits SB2-0 and set SB6 of the SMFLAG register 91. By setting the bit SB6, the DSP automatically causes an interrupt to be generated internally in the control ASIC 30, and an interrupt line of the microcontroller 36 is thereupon triggered. Once interrupted, the microcontroller 36 identifies the DSP as the source of the interrupt and then accepts the message. The microcontroller signals receipt of the message by writing to its MMFCLR register, thereby clearing SB6 of the DSP's SMFLAG register 91. For example, a message value of "2" means that the servo loop has failed and is not ready; a "3" means that the servo loop has recovered from a bump; a "4" means that the servo loop has settled at a destination track following a seek operation sufficiently to permit a write operation; a "5" means that the servo loop is ready; and, a "6" means that the servo loop has settled at a destination track sufficiently to permit a read operation to be performed.

SERVO SECTOR PATTERN

Turning now to FIGS. 2 and 3, a representative data storage disk 18 includes e.g. 64 equally circumferentially spaced apart embedded servo sectors 110 (although only a representative few of these sectors are shown in FIG. 2). Each servo sector 110 includes a sync field, a servo address mark (SAM), track number information, and three time-staggered, radially offset bursts, substantially in accordance with the teachings of U.S. patent application Ser. No. 07/710,172 referred to above. The track number information and the bursts provide a digital value indicative of location of the data transducer head over the data track, in accordance with the teachings of U.S. patent application Ser. No. 07/569,065, now U.S. Pat. No. 5,170,299, referred to above.

There are e.g. 2448 data tracks 116 per disk surface, and there are e.g. 14 data storage surfaces 18 and 14 data transducer heads 20. Each data surface 18 is divided into a series of radial track zones. Preferably, there are sixteen data zones, although only nine zones 112a to 112i are shown in FIG. 2. A radially inner landing zone 114 provides a parking location for parking the head sliders 20 when they are not flying on an air bearing surface resulting from relative rotation between the thin-film storage disks 18 and the thin-film heads 20. Each radial data zone is adapted to a data transfer rate optimized for the radius of the particular zone.

REAL-TIME AND BACKGROUND PROCESSES

The head position servo loop described below employs a two-to-one multirate state-space head position controller. The implications of this technique are shown in the top graph of FIG. 4. Therein, SAM-to-SAM times (208 microseconds) are shown as are control intervals Ts/2 which are defined as the time period between equally spaced OUTS (servo command outputs) occurring at one half the SAM-to-SAM interval, or about 104 microseconds long. The DSP 42 receives an interrupt at each SAM time for each SAM based control interval when valid positional data is available to the servo loop, and another interrupt from a timer for each timer-based control interval when measured head position information is unavailable. Following a SAM interrupt, the DSP 42 performs a series of data manipulations and calculations relating to head position, and puts out a correction current U(t) to the PWM DAC 52 & 53 which then applies this forcing current to the actuator plant (denoted block 140 in FIG. 6) which includes the actuator drivers 54, actuator motor 24, head stack 22 and head sliders 20, for example. The servo loop includes a state-space feedback controller 120 which includes an estimator 122.

The estimator 122 estimates four variables: head position, radial velocity of the head, bias force estimate, and current estimate, and applies these estimates to the feedback controller. The controller generates and puts out the forcing current U(t) during each control interval.

There are two control intervals: SAM and timer, in the same period of each SAM to SAM time, as shown in the top graph of FIG. 4. The SAM interval takes longer because it obtains and processes updated valid head position information. The timer interval takes less real time processing of the DSP 42, because valid head position information is unavailable, and state variables estimated by the estimator 122 are used solely to determine the forcing current U(t) rather than actual measured head position sensed during each servo sector. Each control interval includes a real-time servo process increment (denoted "rt" in the top graph of FIG. 4), and a background servo process increment (denoted "bkgnd" in the same graph).

During each real time increment of the control interval, the DSP 42 is occupied with positioning the data transducer head. This real time increment becomes larger during track seeking when the servo loop is handling considerable head movement dynamics, and is smaller during track following operations, when the head is relatively static in following a selected particular track centerline.

During the background increment, the DSP is available to perform other tasks, including processing of data collected during trace taking operations, for example.

SERVO LOOP

Figure 5:
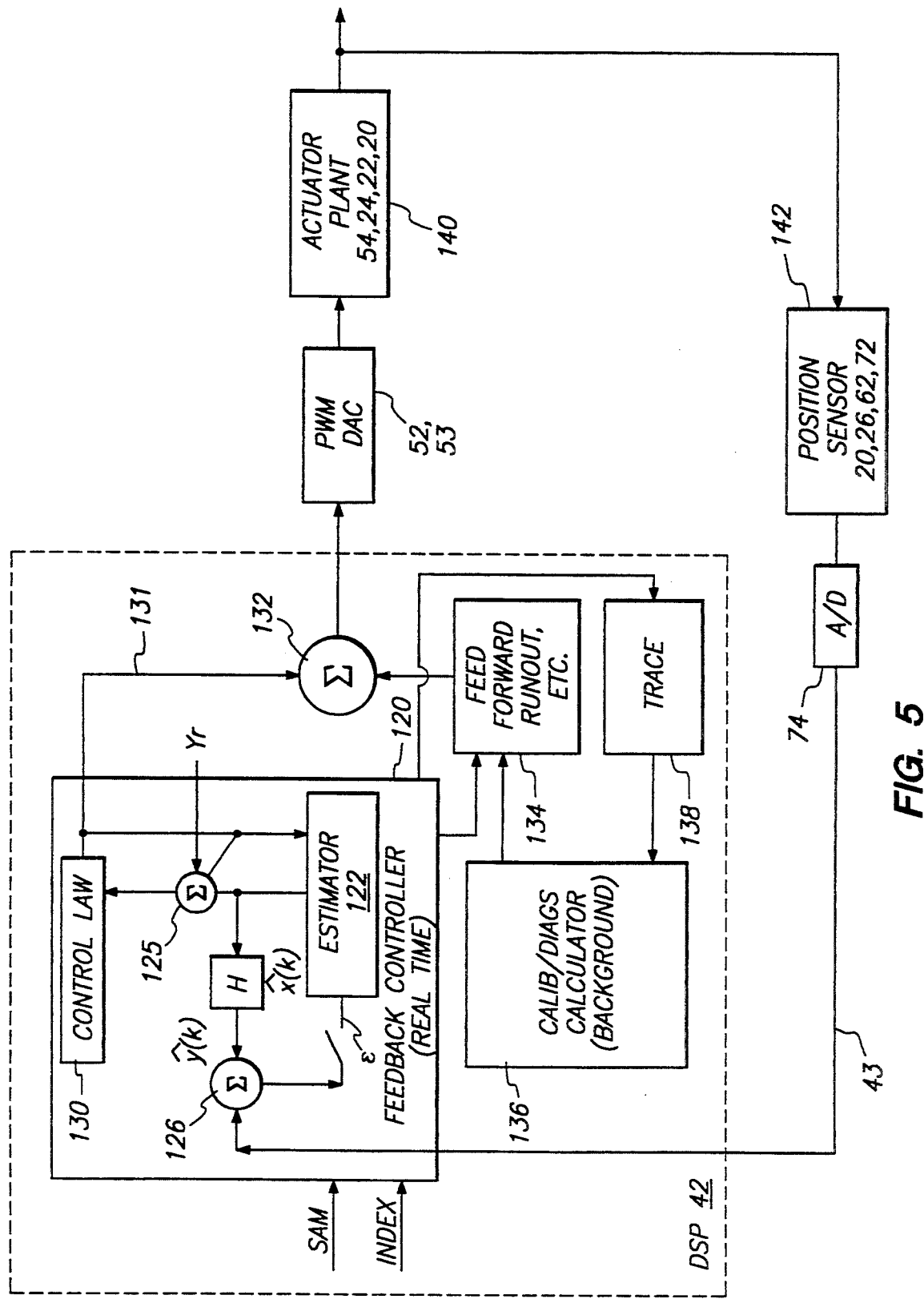
FIG. 5 is a simplified block diagram of a servo loop in accordance with principles of the present invention.
Figure 6:
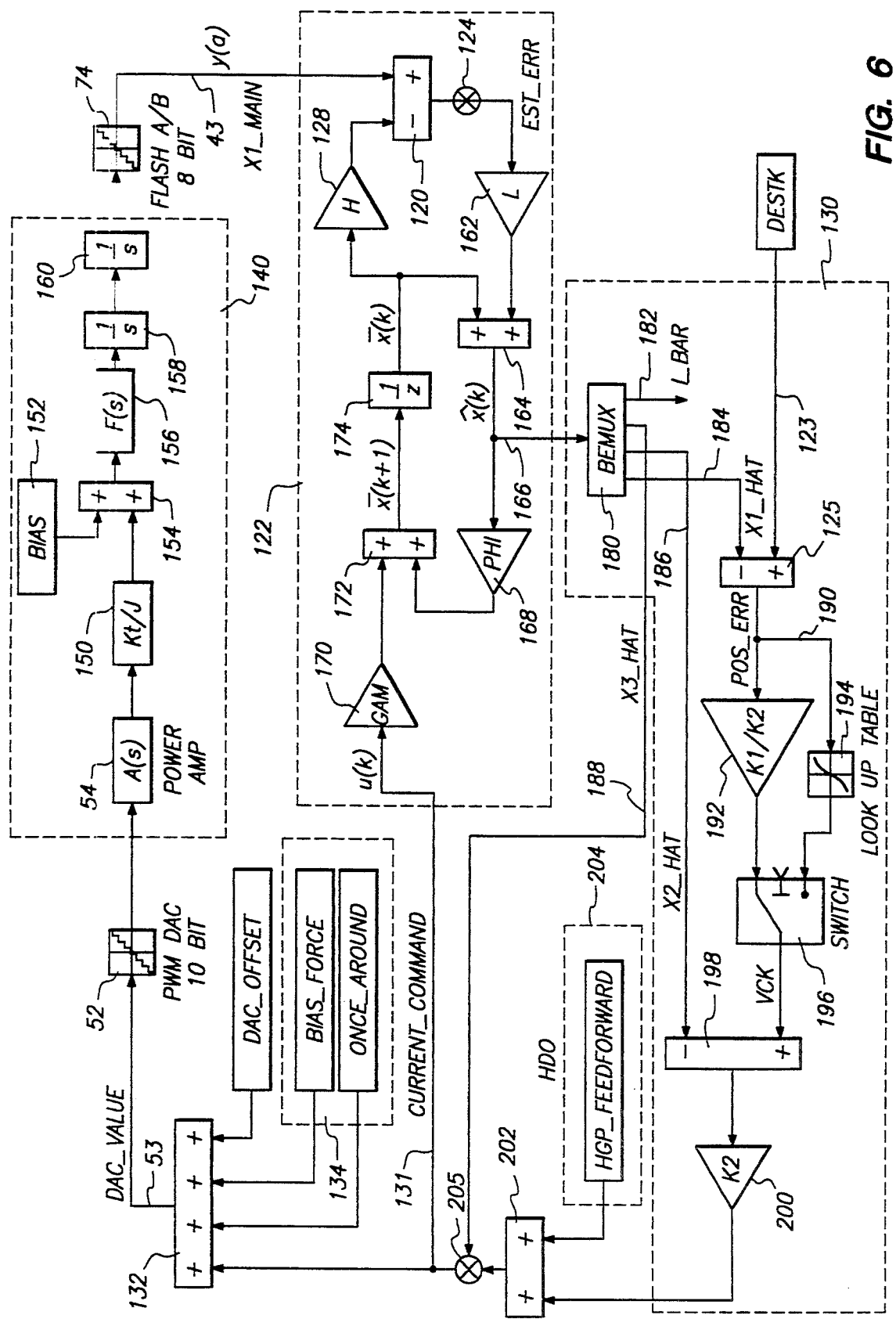
FIG. 6 is a more detailed block diagram of the FIG. 5 servo loop.

The head position servo control mechanism is implemented by program software executed by the DSP 42 and is a multirate state-space estimator, combined with a velocity loop for trajectory control during seeking operations. A summary of the overall implementation is shown in FIG. 5, and the functional details of the loop are depicted in FIG. 6. A detailed functional block diagram of the state-space estimator 122 is given in FIG. 7.

When a servo sector 110 is available to the selected data transducer head 20, the servo head position information is obtained and digitized and delivered to the DSP as position feedback over a path 43. This feedback is then combined with a state command value Yr in a summing junction 125 and the difference is delivered to the control law 130 as shown in FIG. 5. Besides the estimator 122, the feedback controller 120 also includes a multi-rate scaler 124, a summing junction 126, an output matrix H denoted by the block 128 and a control law function 130 which puts out a multi-rate notch filtered command current value u(k) over a path 131 to a summing junction 132. The path includes a multi-rate notch filter function for loop compensation.

The summing junction 132 combines certain correction values, such as bias offset and runout correction fed forward from a register block 134 for example, with the command current value u(k) to produce a corrected command current value U(k). The correction values held in the register block 134 are derived from a trace analysis process 136 carried out in background, and a real-time trace taking process 138 in accordance with principles and aspects of the present invention, described in greater detail hereinafter.

The current command value U(k) supplied to the actuator PWM DAC 52 over the path 53 is held and converted into an analog value which is applied to the actuator plant, denoted by the block 140, at the OUT time noted in the top graph of FIG. 4. This value is applied until the next OUT time from the next control interval, when an updated analog current command is generated and applied.

A position sensor, which senses and puts out actuator actual position y at sample time k ("y(k)"), is denoted by reference numeral 142, and structurally includes the selected thin film data transducer head 20, the read channel preamplifier 26, the pulse/servo peak detector 62, and the half-flash analog to digital converter 74.

FIG. 6 provides a more detailed functional block diagram of the servo loop. The major elements are enclosed in dashed line blocks and have the same reference numerals as found in the FIG. 5 overview. In FIG. 6, the actuator plant has been broken into a series of blocks: Application of a driving current by the power amplifier 54 results in generation of a mechanical force Kt/J in the actuator structure, denoted by the block 150 within the plant model. At the same time, mechanical forces, such as from the flexible connection substrate are also applied. These forces, denoted by the block 152 are mechanically summed with the actuator current-generated force as denoted at 154 and result in movement of the actuator, whose dynamics are denoted by blocks 156, 158 and 160. This movement results in change of the head position signal sensed by the sensor block 142 and converted into head position samples y(k) at each servo time (every other control interval) and put out over the path 43.

As shown in FIG. 6, the estimator 122 includes the summing node 126 which sums the incoming measured position sample y(k) with a position estimate Y(k) provided by the estimator 122 and results in an estimator error. The estimator error is subjected to a two-to-one rate scaling process by a multiplier 124 and is provided to a gain vector circuit L, denoted by block 162. The gain scaled error estimates are then summed at a summing node 164 with a predicted state vector $\bar{x}(k)$ to produce the estimated state vector x(k). Blocks 168 and 170 respectively comprising PHI and GAMMA of the discrete time system state space transition and force input matrices provide outputs which are summed to produce the current estimated state vector x(k+1). The PHI block receives an estimate input from the summing junction 164, and the GAMMA block 170 receives a present current command value u(k) put out over the path 131. A delay 174 provides the next estimate $\bar{x}(k)$ which is then passed through the H output matrix 128 which generates and puts out the estimate Y(k). The state-space estimator 122 estimates four variables: track position x1, head velocity x2, bias force x3, and actuator current x4. These four estimates are put out over the path 166 to the control function 130.

With the present head positioner servo, the positional estimate x1 is compared with presently sensed position y(k). A comparison is then made to determine whether sensed position is within a reasonable range or tolerance, as determined statistically at the factory. If the sensed position has a value outside of the predetermined permissible range, the sensed position value y(k) is determined to be in error and is ignored, and the estimated position x1 is used alone. This procedure thereby eliminates servo loop error due to an erroneous sensed position value, which may be the result of a media defect within the servo field, bit shift, soft errors, noise, or other transient conditions adversely affecting the read channel.

The control function 130 includes a selection function 180 which distributes the four estimates respectively over paths 182, 184, 186 and 188. Estimated position x1 on the path 184 is summed with commanded position on the path 123 in the summing junction 125 and results in a position error. The position error 190 is applied to a K1/K2 function during track following and to a look-up table 194 during track seeking. Respective outputs are selected by a switching function 196 and forwarded to a summing junction 198 which differences the resultant calculated velocity target value VCK with the estimated velocity value x2 to produce a velocity error. The velocity error is scaled into a raw current command value by a scaler 200 and applied to a summing junction 202, along with variables, such as a single track seek value HOP FEEDFORWARD (when this is the case), which are fed forward from a register bank 204. A second summing junction 205 combines the output from the summing junction 202 with the bias force estimate x3 to produce the current command u(k) on the path 131. This current command u(k) is fed back to the GAMMA block 170 of the estimator 122. It is also fed to the summing junction 132 where it is summed with the feed forward variables in the register bank 134 including bias force and repeatable synchronous offset (e.g. spindle runout). The resultant is the corrected current command value U(k) which is applied to the PWM DAC 52.

Figure 7:
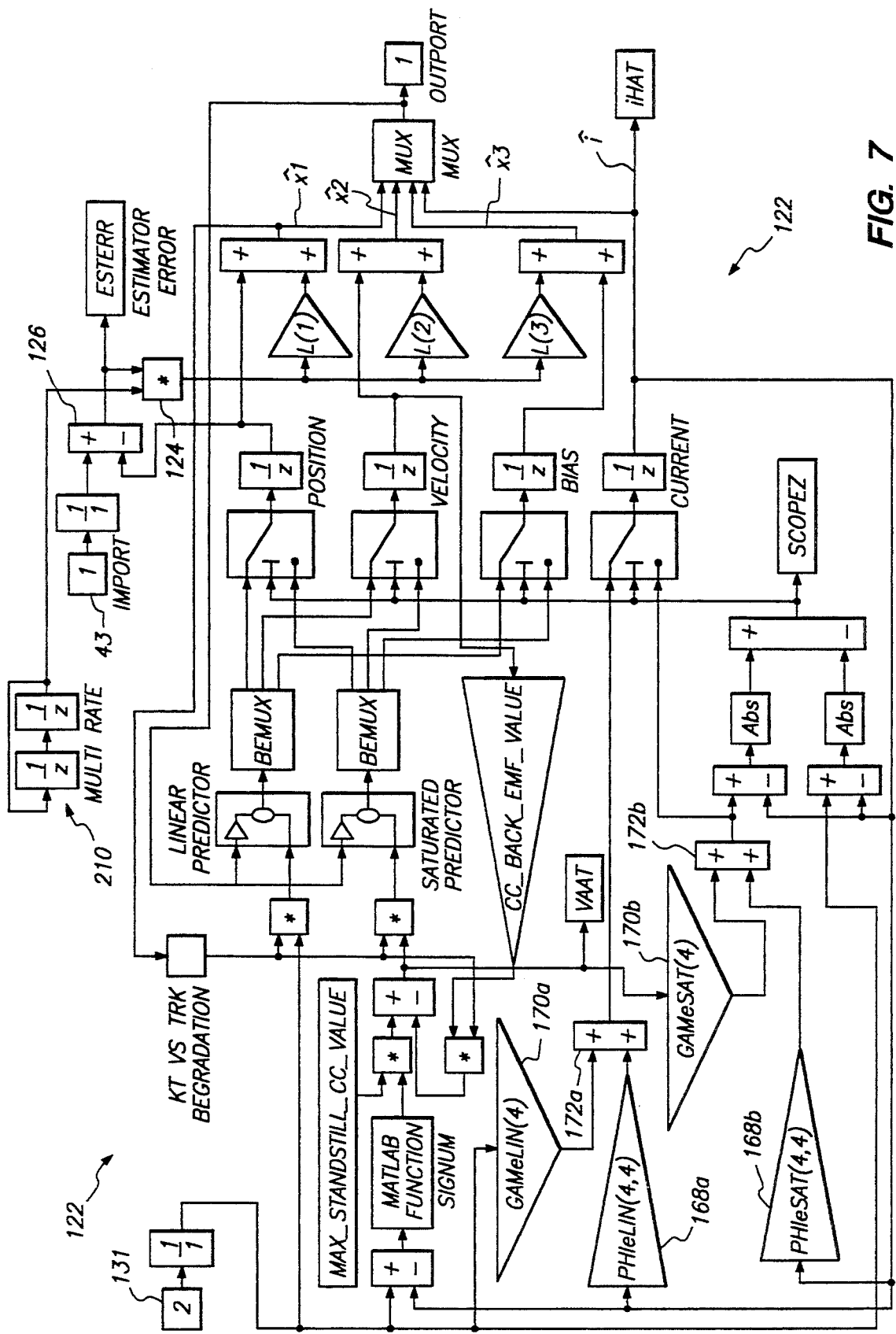
FIG. 7 is a more detailed block diagram of a state-space estimator implemented within the FIG. 6 servo loop.

FIG. 7 is a still more detailed block diagram of the state space estimator 122. It shows the separate development of the position, velocity, bias force and current estimates, and also includes firmware for detecting when the actuator driver is operating in a saturation mode, and when it is in a linear mode. Saturation mode typically occurs when the actuator is undergoing maximum acceleration during longer track seeking operations. A multirate scaler function 210 is depicted in FIG. 7 as alternatively generating a one and a zero for each control interval, the ones being generated for each SAM interval, and the zeros being generated for each timer interval. In practice, preferably the firmware proceeds through separate paths, depending upon whether the interrupt occurred from a SAM signal, or occurred from a timer signal.

TRACE TAKING

Returning for a moment to FIG. 1, in addition to using the four-word shared memory portion of the buffer DRAM 32, the DSP 42 uses the buffer DRAM for storage of some of its calibration tables, and for data traces of servo variables which are taken into a 16K word circular buffer 105. Now turning to FIG. 5, on command, the DSP 42 can end every control interval-by dumping four internal memory locations within the DSP 42 or within the drive digital control ASIC 30 into four word bins in the circular buffer 105 contained in the shared DRAM buffer 104. Once the buffer 105 is filled, it wraps around and overwrites the previously stored values. During one revolution there are 128 control intervals, and thus 512 trace words that may be collected. Alternatively, traces may be taken with each SAM interval. Data from up to 32 revolutions of the disk stack may be collected in the trace buffer 105 before it wraps-around and begins to overwrite previously recorded trace data (64 revolutions may be taken with a SAM to SAM sampling interval).

The traces can be of two types: output only, or input/output. In the output-only mode, four variables OUT1, OUT2, OUT3 and OUT4 are dumped from predetermined DSP locations into the trace buffer 105. In the input/output mode two variables IN1 and IN2 from the trace buffer 105 are written to prespecified locations within the DSP 42 and two locations OUT3 and OUT4 within the DSP are written into the trace buffer 105. The I/O mode is very useful for stimulating the drive 10 with a predetermined disturbance, such as a sinewave, and then obtaining and analyzing a trace record of its response to the predetermined condition. For example, the servo loop may be excited at e.g. 300 Hz, 450 Hz, or 600 Hz and a discrete Fourier transform may be performed on the response in order to find and save the transfer function of the drive at the excitation frequency. This technique is particularly useful to tune the loop gain of the servo loop for optimized performance at its nominal crossover frequency of 400 Hz.

Figure 8:
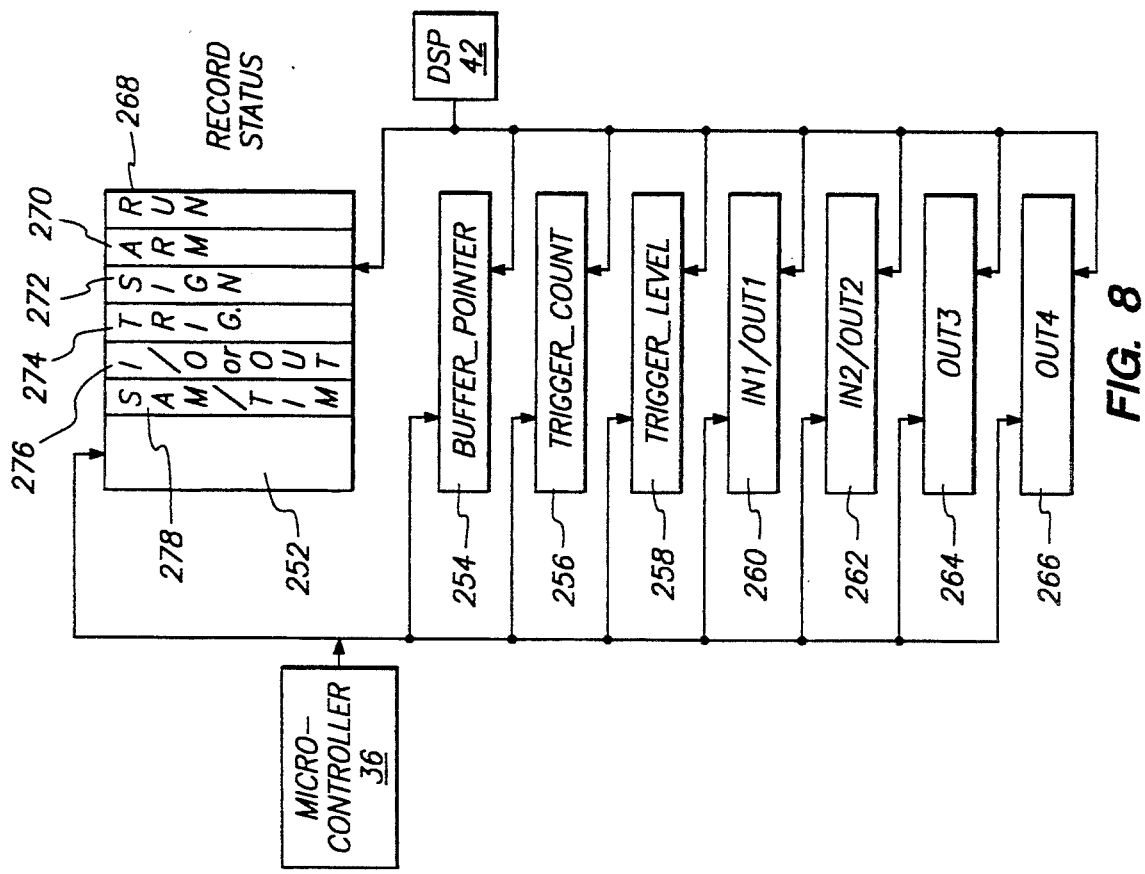
FIG. 8 is a process diagram illustrative of a trace record gathering process carried out by a drive microcontroller and a digital signal processor (DSP) in accordance with principles of the present invention.

FIG. 8 graphically summarizes inter-processor communications in connection with trace taking operations. The microcontroller 36 and the DSP 42 each have access to eight separate memory locations: a record status variable 252, a buffer pointer variable 254, a trigger count variable 256, a trigger level variable 258, an IN1/OUT1 pointer 260, an IN2/OUT2 pointer 262, an OUT3 pointer 264, and an OUT4 pointer 266. The record status variable 252 includes six separate flag bit positions, a run flag 268, an arm flag 270, a sign flag 272, a trigger flag 274, an I/O mode or OUTonly mode flag 276 and a SAM/SAM-timer bit. The mode flag 276 determines whether the addresses in the locations 260 and 262 are input pointers for perturbing the servo loop in programmable fashion, or output pointers comprising trace records. The SAM/SAM-timer flag 278 determines whether trace records are to be taken at each SAM control interval only or at each multi-rate SAM-timer induced control interval. For example, actuator gain measurements are more accurately made on a SAM to SAM interval basis.

Figure 9B:
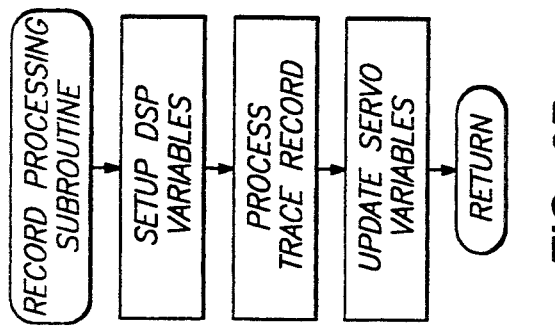
FIGS. 9A and 9B are simplified and highly diagrammatic flow charts illustrative of trace record-taking supervision and utilization processes carried out by the FIG. 8 drive microcontroller.
Figure 9A:
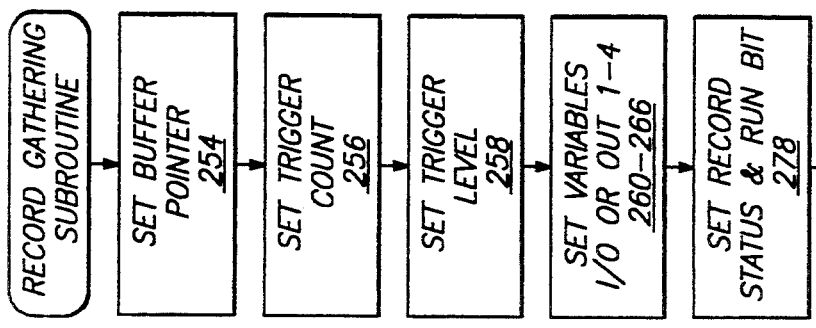

As outlined in FIG. 9A, prior to commencement of trace record taking, the microcontroller 36 loads values into the buffer pointer memory location 254, trigger count location 256, trigger level location 258, and variables pointers 260-268. The microcontroller sets up the record status location 252 e.g. by setting appropriate levels in the SAM/SAM-timer bit 278, the I/O or OUT bit 276 and the sign bit 272. Continuing with the example, the microcontroller 36 sets a zero in the trigger bit 274, a zero in the arm bit 270, and a 1 in the run bit 268. The 1 in the run bit 268 causes the DSP to begin taking trace variable records at the next control interval. When the run bit 268 is set by the microcontroller 36, the trace commences. When the run bit 268 is cleared by the DSP 42, the trace is discontinued.

A trigger criterion on OUT4 is available for taking traces. So long as the arm bit 270 is cleared, the DSP 42 will never trigger. It simply takes trace records for so long as the run bit 268 remains set to 1. When the DSP determines that the trigger criterion is met, it sets the trigger bit 274 to 1 and the trace goes forward for a specified number of control intervals as specified in the trigger count location 256 and then automatically terminates. When triggercount reaches zero, the DSP 42 clears the run bit 268 to zero and stops taking trace records. The trace record thus collected now resides in the circular buffer 105 of the memory 32, awaiting subsequent processing by the microcontroller 36.

Once the trigger bit 274 is set, the DSP no longer checks for trigger criterion, but merely decrements the trigger count value with each control interval. The trigger interval is programmable, e.g. from zero up to 32K. The trigger count may be used to gather traces for conditions occurring before the trigger criterion, or following the trigger criterion. Alternatively, the trigger criterion may occur in the middle of the data trace, in a manner analogous with a digital analyzer including an oscilloscope, so that the resultant record includes data samples taken both before and after the event of present interest.

An immediate trigger mode may be carried out when the microcontroller 36 sets the trigger bit 274 just before setting the run bit 268 to 1. In this mode, the DSP 42 immediately starts taking trace records and counting down the trigger count. This process continues until trigger count reaches zero. Thus, basically, the microcontroller 36 sets the record status bits and the DSP 42 clears those bits. Either the microcontroller 36 or the DSP 42 may set the trigger bit 274.

The trigger criterion is based upon a predetermined 0 logical condition of the fourth variable in relation to a predetermined value stored in the trigger level location 258, e.g. either that the variable is less than or equal to the value (sign bit 272 is low), or that the variable is greater than or equal to the value (sign bit 272 is high), depending upon how the trace is set up.

Figure 10:
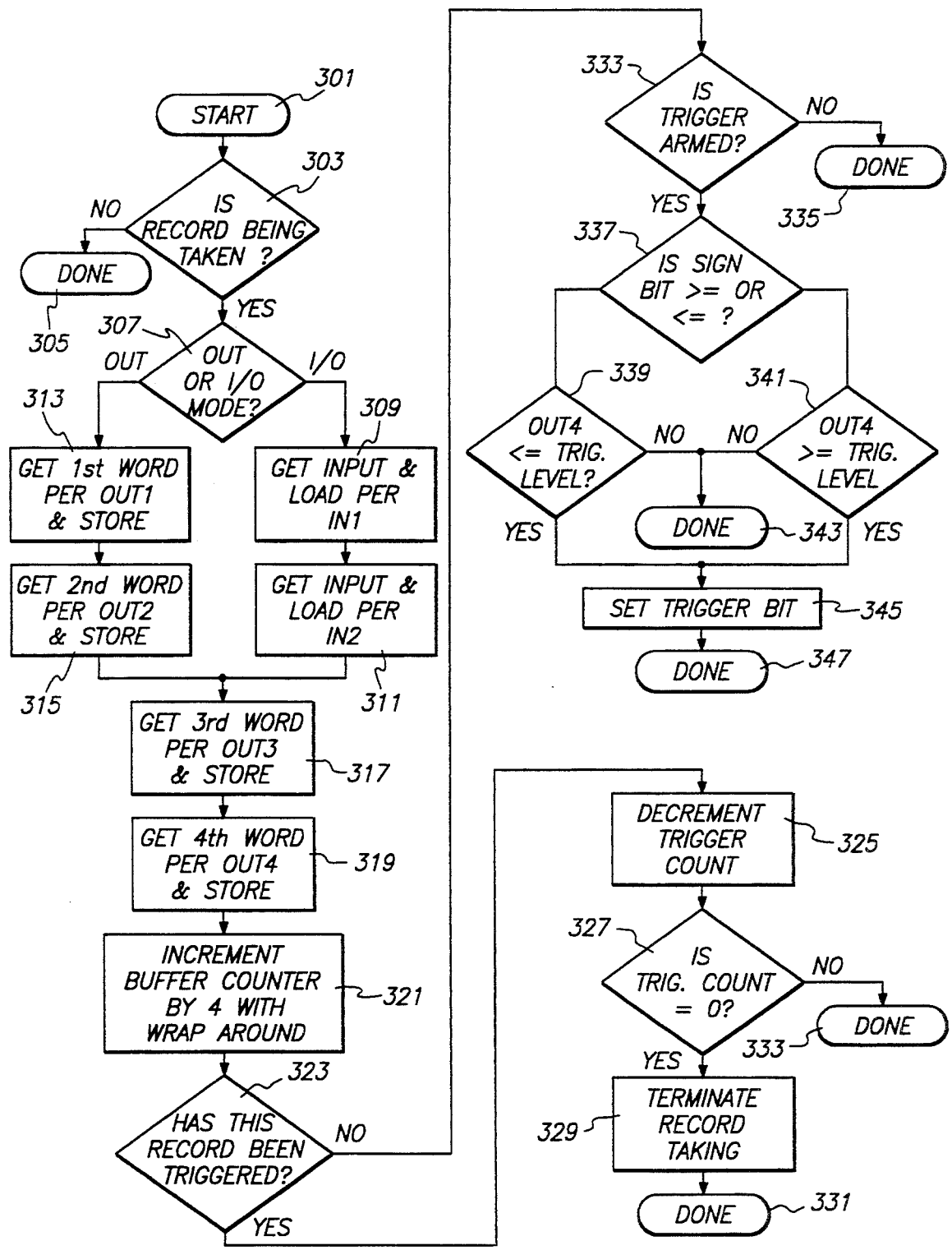
FIG. 10 is a more detailed flow chart illustrative of a trace record gathering process carried out by the FIG. 8 DSP.

FIG. 10 illustrates a trace taking operation carried out during a control interval by the DSP 42. After a start node 301, the firmware decides at a node 303 whether the run bit 268 is set. If not, the trace process is done, at node 305. If so, the firmware determines whether the trace is in I/O mode, or OUT mode at a node 307. If an I/O mode trace taking operation is in process, a step 309 gets the IN1 value and loads it at the address pointed to by the variable in the IN1 location 260. A step 311 gets the IN2 value and loads it at the address pointed to by the variable in the IN2 location 262.

If an OUT mode operation is in progress, the DSP obtains via a node 313 the first variable from the location pointed to by the OUT 1 address in the location 260, and obtains via a node 315 the second variable from the location pointed to by the OUT2 address in the location 262. A node 317 causes the third variable to be obtained from the location pointed to by the OUT 3 address in location 164; and, a node 319 causes the fourth variable to be obtained from the location pointed to by the OUT 4 address. The four OUT variables are stored in the circular buffer 104, while the two IN variables are obtained from the circular buffer 104 and loaded into the locations specified in the IN1 and IN2 locations.

Once the variables have been processed and stored at their respective locations, the buffer counter is incremented by 4 at a node 321, so that the next four variables to be taken at the next trace control interval will be stored in successive storage locations of the circular buffer 105.

A logical node 323 then determines if the trigger bit has been set. If it has, the trigger count is decremented at a program step 325. A logical node 327 determines if the trigger count has reached zero. If so, the trace record taking is terminated at a step 329 by clearing the run bit 268 and the program reaches a done node 331. If the trigger count has not reached zero, a done node 333 is reached directly.

If this record has not been triggered, as tested at the logical node 323, a logical node 333 determines if a trigger arm bit or flag is set. If not, the routine is exited at a node 335. If so, a logical node 337 determines if the sign bit is greater than or equal, or is less than or equal. If the sign bit is less than, etc., a logical node 339 is reached which determines whether OUT 4 is less than or equal to the predetermined trigger level. If the sign bit is greater than, etc., a logical node 341 is reached which determines whether OUT 4 is greater than or equal to the predetermined trigger level. If the determination from either logical node 339 or 341 is negative or false, the FIG. 10 is exited at a node 343. If the determination from either logical node 339 or 341 is true, a process step 345 is reached which sets the trigger bit, and the FIG. 10 process is then exited at a node 347.

During background increments, the DSP is able to perform programmable operations on the trace records. This capability is outlined in FIG. 9B. In order to cause the DSP 42 to process the trace records, the microcontroller 36 must first set up certain variables at the DSP. It then causes the DSP to process the trace records in accordance with the variables. Once the results are available from the DSP 42, the microcontroller 36 uses them e.g. to update the servo loop variables appropriately.

The background process operators performed by the DSP 42 may average a vector. The process operator may fill the vectors with sine and cosine signals, such as OUT1=sine(nS) and OUT2=cosine(nS), where S is the spindle frequency, and n is an integer between 1 and 64 and designates the particular servo sector relative to a once-around index marker. The process operator may find the inner products of certain vectors, such as SUM13—OUT1·OUT3; SUM23=OUT2·OUT3; SUM14=OUT1·OUT4; and SUM24=OUT2·OUT4, for example.

As used herein the expression "inner product" for e.g. OUT1·OUT3 is defined as:

$$\text{OUT1} \cdot \text{OUT3} = \sum_{i=1}^{N} \text{OUT1}(i) \cdot \text{OUT3}(i)$$

N = Number of sample points per trace

The process operator may also handle real and complex variables, such as find the sum of $|\text{SUM14}+j\text{SUM24}|/|\text{SUM13}+j\text{SUM23}|$. This operation facilitates determination of the mechanical force Kt/J in the actuator model 150.

POWER ON CALIBRATION

When the drive 10 is first brought up to speed and a servo track has been acquired, the first calibration routines occur. They determine the physical constants that vary from drive to drive, and adjust the head position servo parameters so that each drive performs in an optimal fashion. All calibration procedures are broken down into small steps, each accomplishing a specific process in the overall calibration procedure. A state machine implemented by control software executed by the microcontroller 36 sequences through a series of steps which consist of reading from, or writing to, the DSP's memory, doing a short calculation, and/or commanding the DSP to do a specified function. A looping facility is provided to cover waiting for a servo task to be completed, or to add dimension for multiple heads or tracks. Calibration comprises stepping from one state to the next, looping if necessary, until the whole process is completed. Between states, control is returned to a supervisory loop of the microcontroller 36 so that other functions of the drive can operate concurrently in a time-slice fashion. The descriptions below of the calibration steps are represented in pseudo-C code, each statement representing a state in the calibration state machine.

PERIODIC UPDATE

In addition to a power-on calibration, during actual operation of the drive 10, certain variables must be adjusted to compensate for parameters that are functions of time and/or temperature. These variables have been collected under a periodic update procedure which is scheduled for execution sufficiently frequently so that temperature dependent parameters do not adversely affect drive performance. For example, periodic update is scheduled at 0.25, 0.5, 1, 2, 4, 8, 16, 16 ... 16 minute intervals from the power-on calibration. Periodic update is processed as if it were a command from the host computer. When the specified time has elapsed, a start calibrate entry is made into the drive's command queue administered by the microcontroller 36. The start calibrate command is then executed along with all other commands coming from the host (there is a provision to guarantee room in the command queue for the start calibrate command). The start calibrate command starts the periodic update state machine. Each state performs a simple task and, when completed, the periodic update state machine makes a command queue entry for either that state or for the next state. There is never more than one periodic update related command queue entry at any time. The new command queue entry then competes with other host commands in the queue for drive attention and resources. The states used during periodic update are the same states as are used during power-on calibration. Certain periodic update states must not be overlapped by a host directed seek command. These uninterruptable commands are collected into indivisible control program blocks called "atoms". Each atom locks out the host computer, performs its task, and then returns the actuator 22 to the head and cylinder as specified at the beginning of the atom. The time spent in executing atoms is critical and is always minimized. The following table illustrates the times required for each calibration atom:

TABLE

CALIBRATION ATOMS

| | |
|---|---|
| Disk revolution for DAC record | 2 |
| Disk revolutions for PES record | 4 |
| Disk revolutions for Kt/J record | 8 |
| Kt/J excitation frequency | 600 Hz |
| Disk revolutions for repeatable runout record | 8 |
| Runout adjustment at each control interval | 25% |
| Disk revolutions for head-disk offset record | 2 |
| Total time required for periodic update (where d = number of disks) | <(80 + 130d)ms |
| Longest atom lockout time | <120 ms. |

CALIBRATION PROCEDURES

The following sections provide brief descriptions of each calibration function and pseudo C code listing of the calibration states. Atoms are indicated by atom{} statements. Atom lockout and any associated "restore drive" directives are not applicable to the power-on calibration process.

DAC OFFSET

The output of the servo calculations is sent to the DAC 52. This DAC 52 must have a sufficient dynamic range to accommodate peak commanded current values during seeking as well as small incremental current values during track following. The 10 bit range of the DAC 52 is insufficient to cover adequately both seeking and tracking without granularity problems. To provide the necessary peak currents needed for good seeks and to have enough steps for good tracking, a switchable 8X multiplier is provided at the output of the DAC 52. This multiplier is enabled during seeking operations. At the end of a seek, the X8 gain is switched out, and this transition must not introduce a perturbation of the head seek trajectory. This is crucial in order to minimize head switch time, since the control program initiates a full seek sequence for every seek, even if only a head switch is needed for the seek. The X8 gain factor is carefully taken into account in the servo control software and hardware, but the PWM DAC conversion process performed by the DAC 52 introduces an offset voltage which changes slightly with temperature. The DAC offset calibration procedure is designed to sense and adjust that offset, so that there is no detectable bump when switching off the X8 gain multiplier. The DAC offset calibration tracks at both gain settings and adjusts the offset of the DAC 52 so that the observed average tracking current is the same for both both high gain and low gain settings. Thus, the actual actuator current will have the same average, regardless of the gain setting. In the listings below VCM equals "voice coil motor" and refers to the actuator 24.

```
Power-On and Periodic Update DAC Calibration Steps:
    Initialize DAC Calibration variables;
    do {
        atom {
        Switch VCM to high gain;
        Take trace record of VCM_current_command u(k);
        Average each trace vector;
        Switch VCM to low gain;
        Take trace Record of VCM_current_command u(k);
        }
        Average each vector;
        Compute delta_offset and adjust DAC offset;
    }while(|delta_offset|>OFFSET_THRESHOLD).
```

PES GAIN AND BIAS FORCES

The position error signal PES derived from a servo sector 110 is made up of two components: a track number read by the servo state machine 86 in the digital drive control ASIC 30, and a fractional part obtained by comparing relative amplitudes of the centering bursts of the servo sector. The track number is digitally gray coded in the track number field of each servo sector, and the fractional part is derived from reading analog burst peak levels of three constant amplitude, radially offset bursts in the burst field of the servo sector. In accordance with the teachings of U.S. patent application Ser. No. 07/569,065, now U.S. Pat. No. 5,170,294, referred to above, and as shown in FIG. 8 herein, the three bursts are known as the A, B and C bursts are radially staggered and circumferentially offset relative to each track location (head path). The analog position signals generated by the A and C bursts are offset by +90 degrees and by −90 degrees respectively from the B burst. At any servo sector, the servo process may accurately determine the position of the head relative to a track passing below the head. During track following operations, the servo determines track center to be that point at which the A burst amplitude equals the C burst amplitude, with the fractional PES being K(A-C) or K(C-A), depending upon if the track is odd or even.

Figure 11:
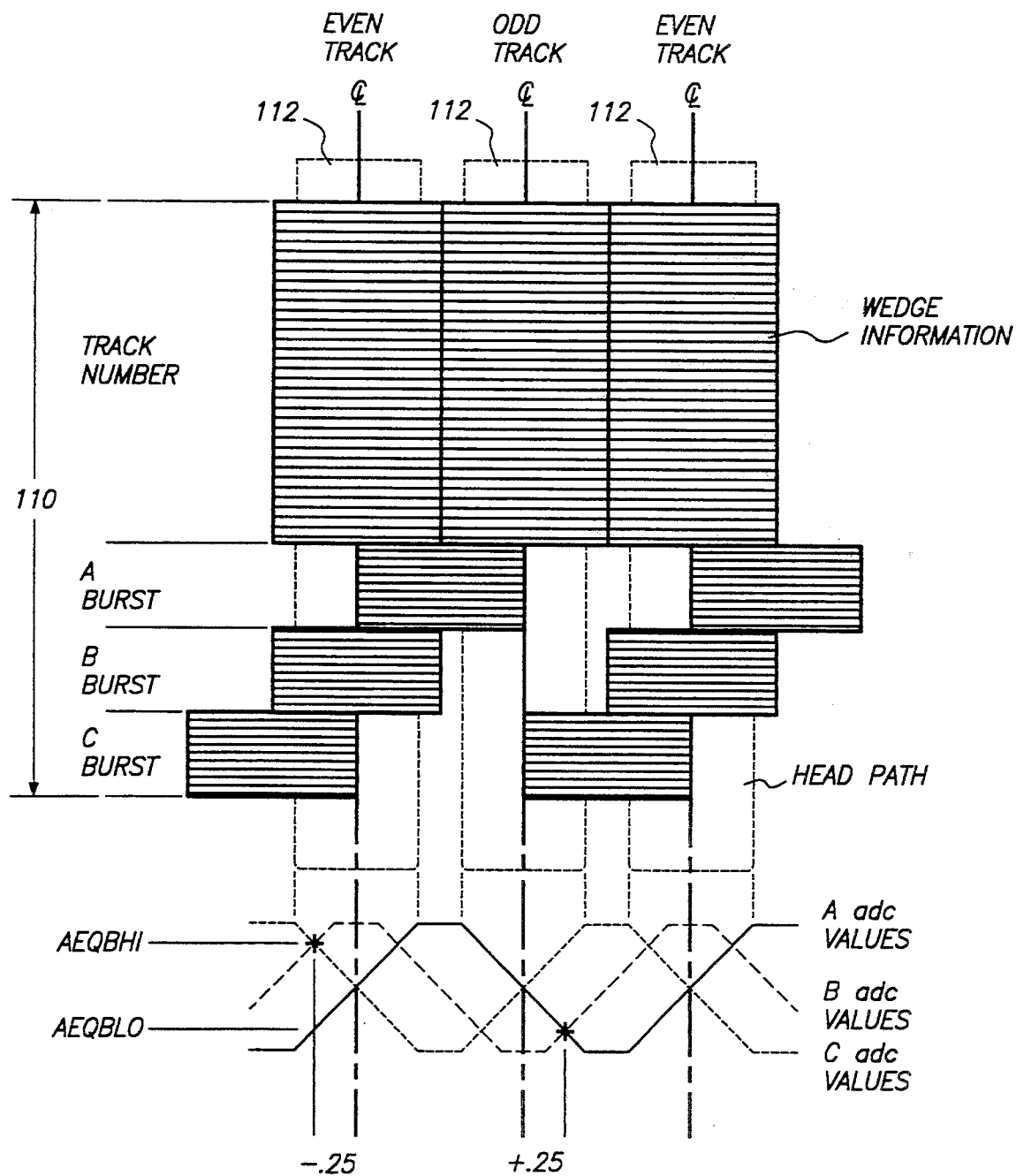
FIG. 11 is a highly diagrammatic and greatly enlarged plan of a servo sector at three adjacent track locations.

In order to map accurately the ADC values to a fraction of a track, the coefficient K must be determined for each data transducer head 20. This determination is made by placing the servo loop into a special mode that causes it to use the B amplitude value in place of the C amplitude value. By substituting B for C in the track following servo mode, the head follows a locus at which the A burst amplitude equals the B burst amplitude, either high or low. These positions are marked by "+" in FIG. 11 and represent a PES of ±0.25 track pitch. The factor K for the selected head 20 is determined by the quantized difference in value between A equals B high (AeqBhi) and A equals B low (AeqBlo) which nominally represents 0.5 track pitch. The variation in the K factor is then approximated linearly across the radial extent of displacement of the head actuator by interpolation and extrapolation from calibration tracks which e.g. are located at 200H and 600H data track locations.

In order improve settle times at destination tracks and more accurately to keep the selected head 20 at track centerline during track following, all predictable static forces on the VCM must be taken into account and compensated. These forces are caused by the flex cable leading from the housing to the moving actuator, airflow between the actuator structure 22 and the rotating disks, actuator spindle bearing dynamics, and other miscellaneous forces and influences. Hysteresis in the magnetic circuit and actuator bearing causes bias force during inward seeks to differ from bias force present during outward seeks. All of these influences are collected into a bidirectional bias force term that is assumed to be a function only of radial position and seek direction. For the drive 10, the bias force can be adequately approximated by two linear functions of radial position, one for inward seeks, and the other for outward seeks. Bias force calibration consists of servoing at various radial positions and directions, measuring the current necessary to stay on track, making table entries, and filling the calibration table by extrapolation and interpolation.

Power-On PES Calibration Steps:
```
Initialize PES Calibration Variables:
    for(track=0X200; track<=0X600; track+=0X400) {
        for (head=0; head<NUMBER_OF_HEADS;head++){
            Seek to head:track;
            Set servo to A=B mode:
            Take trace record of A_burst, B_burst, and
VCM_current;
            Average each vector;
            Get AeqBhi and outward bias;
            Seek to head:(track+1));
            Set servo to A=B mode;
            Take trace record of A_burst, B_burst and
VCM_current;
            Average each vector;
            Get AeqBlo and outward bias;
        }
    }
    Seek to head:(0X500);(change seek direction for inward bias);
    Take trace record of A_burst, B_burst and VCM_current;
    Average each vector;
    Get inward bias hysteresis;
```

For drives manifesting a significant repeatable runout component, the PES signal may become non-linear and makes determination of the correct PES difficult. In addition, the operation of averaging the A burst and B burst trace vectors does not provide the best estimate for the A=B point (+ in FIG. 8). As A burst increases, B burst will decrease, but possibly in a non-linear fashion, and the averaging operation is effected by this non-linearity. Accordingly, instead of an averaging operation, the median of the trace vectors maybe identified and selected.

Kt/J PROFILE

The term Kt represents the coupling between the actuator current and the resultant torque force. (Kt also describes coupling between the actuator angular velocity and the back-EMF). Thus, Kt/J (where J is the actuator rotational inertia) maps VCM current to angular acceleration. While magnetic circuit design of the rotary voice coil actuator 24 attempts to achieve a constant coupling Kt across the range of the actuator's angular displacement ("stroke"), tolerances manifested from drive to drive result in a unique Kt for each actuator. If the Kt/J profile is known for a particular drive, the servo loop can adjust itself to maximize the performance of the drive. This profile is used to keep the bandwidth of the servo loop constant and to modulate the seek trajectory across the actuator's stroke.

The Kt/J calibration process is, in essence, the steps of measuring the transfer function of the servo loop at a constant frequency and, knowing the expression for the discrete time transfer function, solving for the Kt/J component. This operation is carried out across the stroke to yield the Kt/J profile.

Power-On Kt/J Calibration Steps:
```
Initialize Kt/J Calibration Variables;
Fill vectors with sine and cosine signals;
    -IN1=sin(kS);
    -IN2=cos(kS);
    for (track=0X100;track<=LAST_TRACK;track+=0X100{
        Seek to head:track;
```
-continued
```
        Take trace record, injecting sinewave(kS) as
disturbance;
            -OUT3=VCM_current;
            -OUT4=PES;
        Find inner products of selected vectors;
        Find |SUM14+jSUM24|/|Sum13+jSUM23|;
        Scale result, store as Kt/J in calibration table.
```

The shape of the Kt/J profile shouldn't change from one drive to the next, only the relative values. Kt/J may be determined at eight or nine locations across the stroke, or preferably, a single measurement of Kt/J may be taken and a predetermined profile scaled by that measurement stored in the calibration table.

HEAD OFFSET

Head offset (HDO) is a radial position error of one head 20 to the next or others among the heads of the actuator head assembly 22. Head offset is, by definition, zeroed at servo write, since the process of servo writing defines the head location relative to the other heads. As suggested by FIG. 4 hereof, the drive 10 is servo-written by sequencing progressively through the head stack at each track location ("cylinder"), i.e. switching to the next head after the first servo is written. This skewed pattern is shown in FIG. 4. For example, the servo 110 is written at a first time for head 0. Then, after an interval of ⅛ths of the SAM to SAM time, the servo sector 110 is written for head 1, and so forth down the head stack, from head 0 to head 13. In order to write all 14 surfaces, only four revolutions of the disks are required for each cylinder.

As temperature differences occur, or over a series of thermal cycles, the head flexures relax, and the heads 20 are no longer in precise vertical alignment. The head offset calibration procedure measures these offsets and uses the resultant information as a feed-forward signal to minimize head switch times.

In order to carry out the head offset calibration, special servo tracks are employed. Accordingly, the drive 10 is provided with four dedicated servo tracks at the radially outermost region of the disk. These servo tracks are filled with back-to-back servo sectors. When these tracks are being followed by the head position servo loop, servo sectors of other heads may be read during what would normally be data time (background), and by so doing, the PES of any other head may be directly obtained and yield the head offset. This information is placed into a table which is referenced at the beginning of a head switch operation.

Power-On and Periodic Update HDO Calibration Steps:
```
Initialize HDO Calibration Variables;
    for (head=0;head<NUMBER_OF_HEADS;Head++){
        atom {
            Seek to Head:HDO_track;
            Select alternate head;
            Take record of alternate head PES;
            Restore drive;
        }
        Average each vector;
        Get head offset;
    }.
```

REPEATABLE RUNOUT CORRECTION

Disk shift is defined as anything that causes the servo loop to manifest a sinusoidal actuator current which is synchronous with a once-per-revolution, or index, marker. Disk shift is also known as "synchronous runout", "repeatable runout" ("RRO") and "once-around". Disk shift is a summation of many radial position error sources which may include the disk clamp, spindle bearings, spindle motor, etc. For example, the disk clamp may shift radially over a number of thermal cycles. The spindle bearing race revolves at ½ the spindle speed and causes a ½ harmonic. There may be defects in the bearing races which result in a first harmonic error, and ball defects may result in higher harmonic disturbances. The spindle motor may cause thermally induced errors at a harmonic of the number of motor poles. Both repeatable runout and nonrepeatable runout components may be present during the servo writing process and become yet another disk shift error. The very nature of repeatable runout or disk shift means that it is somewhat predictable. Efforts to reduce disk shift error by prediction and feed forward techniques reduce track misregistration errors and enable data storage tracks to be placed closer together, with more tracks thereby being accommodated within a given disk storage annulus.

In particular, the fundamental component of runout is of interest. For disk shift correction, a trace measurement is made for each head at an arbitrary location. A track centerline is followed by the servo loop during track following, and a trace vector of the VCM current command u(k) is taken over at least one revolution. A discrete Fourier transform (fundamental frequency only) is taken from a trace record of the current values being sent to the actuator via the digital to analog converter 52 and driver 54. In principle, this is the current that the feedback control system is sending to take out the once-around error. Using only the first harmonic of the spindle frequency, the disk shift (RRO) may be expressed as follows:

$$RRO = A\cos(S) + B\sin(S),$$

where S is the spindle frequency or angular position.

The RRO calibration finds new estimations of A and B by periodically performing the discrete Fourier transform of the VCM current U(k) at the spindle frequency (75 Hz). This process is carried forth by taking the inner product of the VCM current with cos(S) and sin(S) to yield A and B. The trace record taking facility 138 and the trace record processing facility 140 (operating in DSP background increment of a control interval) makes the RRO calibration update a simple series of steps:

---

Power-On and Periodic Update RRO Calibration Steps:
   Initialize RRO Calibration Variables;
   for (head=0;head<NUMBER_OF_HEADS;head++){
     atom {
     Seek to head:current_track;
     Take trace record of VCM_current, triggered at index;
        OUT3=VCM_current;
        OUT4=angular position;
        Restore Drive;
     }
     Fill vectors with sine and cosine signals;
       -OUT1=sin(S);
       -OUT2=cos(S);
     Find inner products of selected vectors;
     Scale results, store as sine and cosine components.
   }.

---

The once-around correction components are then retrieved for each control interval and applied to the servo loop at the register block 134 as feed forward values. Following a head switch, a switch is made to coefficients obtained for the selected head during its calibration routine.

Transient frequencies, or frequencies close to the DFT frequency, can cause incorrect RRO values being locked in for feed forward. These transients may be caused by external sources that happen to sweep through the DFT frequency during the RRO trace record taking process, such as spin-up of a fan and/or other disk drives starting or continuing in operation. If the RRO feed forward correction values are in error, an undesirable situation will occur when the locked-in feed forward correction becomes 180 degrees out of phase with the transient RRO and the effects become additive. One can continuously generate A and B values that minimize some error criterion. It can be shown that the discrete Fourier transform process is the same as doing a least squares (LQ) fit to a sine and cosine of a given frequency. The LQ product and low pass filter can be expressed as an iterative process and the steps integrated as a part of the process carried out during each real time increment of the control interval.

Any sensitivity to these external influences may be reduced by integrating a low pass filter function into the RRO coefficient update process and by not making a full RRO update at each RRO calculation. This approach assumes that the external influences are not correlated with the RRO update schedule. The calibration process may be repeat ed in a series of calibrations, each of which removes a fraction of the runout, until it is effectively completely removed. The first calibration routine makes a considerable difference, however.

If the servo loop has 20dB of gain at the once-around frequency, in principle one application of the present approach will give a 40 dB gain, because 9/10ths of the runout will be removed by the calculated feed-forward value, and 9/10ths of what remains will be removed by feedback control. In practice, this approach may not achieve gain squaring, but it is at least a factor of four better in removal of synchronous runout over feedback control alone.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A disk drive including an on-board digital sampling analyzer, the disk drive including:
   a data storage disk spinning at a predetermined velocity,
   a data transducer head for reading information recorded on a storage surface of the storage disk,
   the data storage surface comprising a multiplicity of concentric data storage tracks including a plurality of radially extending, circumferentially spaced apart embedded servo sectors including head position information, an electromechanical actuator mechanism for positioning the data transducer head relative to the disk, a digital actuator controller means for controlling the actuator mechanism within a closed loop head positioner servo during a servo loop control interval related in time to passage of each said servo sector by the data transducer head and having a plurality of addressable internal registers at addressable locations, a data block buffer memory for temporarily storing blocks of user data being transferred between the disk storage surface and a host computing system and for storing at least one sequence of trace values, memory controller means for controlling addressing of the data block buffer memory, and disk drive interface means communicating with the data block buffer memory, with the memory controller means, and with the digital actuator controller means for receiving control values from, and for transfer, storage and retrieval of user data between the disk storage surface and a host computing system, the digital actuator controller means comprising a programmed digital microprocessor with firmware implementing the digital sampling analyzer and including:

memory buffer configuration means connected to the memory controller means for configuring at least a portion of the data block buffer memory as a circular trace buffer for storing a sequence of trace values, trace value taking means for transferring the sequence of program selected trace values taken from at least one of the plurality of addressable internal registers of the digital actuator controller means during a real time increment of a servo loop control interval determined by a predetermined trigger parameter and for recording the sequence of trace values within the circular trace buffer of the data block buffer memory, and trace processing means for retrieving and processing the sequence of program selected trace values into processed trace information during a background increment of the control interval, the processed trace information being recorded in the memory means, the digital sampling analyzer further including:

trace value selection register means responsive to the disk drive interface means for receiving and storing at least one trace parameter for selecting said addressable internal register, and trigger parameter register means responsive to the disk drive interface means for receiving and storing said trigger parameter, the trace value taking means being responsive to the stored trace parameter and the stored trigger parameter.

2. The disk drive set forth in claim 1 wherein the disk drive interface means includes a programmed digital microcontroller supervisor means, and further comprising commonly accessible memory locations within the data block buffer memory for interprocessor signalling and communications between the programmed digital microprocessor and the programmed digital microcontroller supervisor means, and further wherein the digital microcontroller supervisor means includes calibration means for performing a plurality of predetermined calibration operations, each requiring processed trace information recorded in the memory means for calibrating the closed loop head positioner servo.

3. In a disk drive head position servoing method in which a servo process includes within a disk drive an on-board programmed digital microcontroller which generates servo state estimates and puts out head position correction values during discrete control intervals occurring during a revolution of a data storage disk, the head position correction values being based at least in part upon said servo state estimates to reposition an electromechanical head positioner, the head position correction values being based upon a difference between a commanded positional value and a measured positional value read by a data transducer head as each one of a series of embedded servo sectors including prerecorded head position information pass by, each control interval being related in time to passage of a said servo sector by the data transducer head and including a real-time head position control increment and a background increment following completion of the real-time increment, an improved triggered trace taking method comprising during the real-time increment the steps performed by the programmed digital microcontroller of:

determining whether for a present real-time increment a sequence of trace values are to be taken in accordance with a predetermined trigger parameter, and if so, collecting the sequence of trace values of servo parameters stored in at least one servo process register, and recording the trace values in a circular buffer portion of a disk drive data block buffer memory, determining whether a trigger bit has been set, and if so, determining whether a trigger count in a trigger count memory location is equal to a predetermined value, and if not, adjusting the trigger count in the trigger count memory location; and if so, setting a value to terminate taking of trace values at a next real-time increment;

and if the trigger bit has not been set, determining whether a trigger bit setting condition has occurred and if so, setting the trigger bit; the method comprising during one or more of said background increments the steps performed by the programmed digital microcontroller of:

configuring the data analyzer by reserving a selected portion of the disk drive data block buffer memory as a circular buffer portion for storing the sequence of trace values before the step of collecting the sequence of trace values, and setting the trigger parameter in a trigger parameter memory location, setting a trigger count in a trigger count memory location to fix the length of the sequence, and setting a trigger bit setting condition in a trigger bit setting condition memory location, retrieving the trace values from the disk drive circular buffer portion after the sequence of trace values has been collected during a previous real time increment, analyzing the trace values in accordance with predetermined criteria and recording trace values analysis information in an analysis information memory location.

4. The method set forth in claim 3 comprising during the real-time increment the step injecting at least one externally specified excitation value into the servo process and during the background increments the additional steps of generating the excitation value and analyzing the trace values taken during injection of the externally specified excitation value to determine the servo process response thereto.

5. The method set forth in claim 5 wherein during the background increment the configuring step includes the further steps of:
   setting a buffer pointer variable in a memory location pointing to a location in the memory for storing the trace record,
   setting an OUT pointer value variable in a memory location pointing to a location of the predetermined parameter,
   setting a record status flag for signalling that a trace record is to be taken during a next real-time head position control increment; and comprises during a subsequent real-time increment the further steps of polling the record status flag during the real-time increment and performing the steps of taking the trace in response to a setting of the record status flag.

6. The method set forth in claim 3 comprising the further steps during the background increment of setting four OUT pointer value variables in four memory locations pointing to locations of four predetermined trace parameters for which traces are to be taken, and during a subsequent real-time increment the further steps of taking a trace of each of the four predetermined trace parameters and recording the traces as part of a said trace record in the memory.

7. The method set forth in claim 3 wherein the real-time increment includes the step of combining at least one performance correction parameter as a feed forward value with the head position correction value generated during the real-time increment to produce a corrected head position correction value and applying it to reposition the electromechanical head positioner; and, wherein the one or more background increments comprise the step of generating the said at least one performance correction parameter as a function of the trace record and storing the parameter for use during a next real-time increment.

8. The method set forth in claim 3 wherein during the real-time increment the step of determining whether a trigger bit setting condition has occurred comprises the steps of:
   determining whether a sign bit establishes the trigger setting condition above or below a measurement value of a predetermined trace parameter,
   comparing the measurement value of the predetermined trace with the trigger setting condition, and when true,
   setting the trigger bit.

9. The method set forth in claim 3 wherein during the real time increment the step of adjusting the trigger count in the trigger count memory location comprises the step of decrementing the trigger count by a unit corresponding to the said real-time increment.

10. A disk drive architecture including an embedded, on-board digital analyzer of aiding calibration and diagnosis of head positioning operations, the architecture including:
    at least one rotating magnetic data storage disk defining a multiplicity of concentric data tracks including circumferentially spaced apart servo sectors,
    a rotary voice coil actuator structure for positioning a magnetic read/write head structure relative to the concentric data tracks for reading data including embedded servo data from, and for writing user data to, the tracks,
    a digital sampling servo control loop including a programmed digital microcontroller and a state-space estimator implemented during a real time servo control increment related in time to sampling of said embedded servo data from servo sectors of a data track for estimating head position based in part upon the embedded servo data for controlling the rotary voice coil actuator structure, the digital sampling servo control loop further including a servo correction register and a summing-junction downstream of the state-space estimator for adding correction values held in the servo correction register and generated by the embedded, on-board digital analyzer to an actuator position correction signal, the programmed digital microcontroller executing background tasks during background intervals between real time servo control increments,
    a read/write data channel between a host interface and the read/write head structure, the read/write channel including a data sequencer for sequencing blocks of data to and from the data storage disk, and a data block buffer memory for temporary storage of the blocks of data being sequenced,
    a buffer memory controller for controlling addressing of the data block buffer memory, and including buffer pointer registers and structure for configuring at least a portion of the data block buffer memory to be configured as a circular buffer, and for receiving and storing a sequence of trace values, the sequence being comprised of plurality of trace values taken during each real time servo control increment during a trace sampling time interval, the embedded, on-board digital analyzer comprising:
    the programmed digital microcontroller being connected to the buffer memory controller at least during a background control increment for setting buffer pointer variables in the buffer pointer registers for pointing to a location in the circular buffer portion for storing plurality of trace values to be taken in a subsequent real time servo control increment, for setting an OUT pointer value variable in a trace location register for pointing to at least one circuit location within the digital sampling servo control loop for taking the plurality of trace values, and for setting a record status flag for signalling that a plurality of trace values are to be taken during a next real-time head position control increment;
    the digital sampling servo loop for polling the record status flag during the subsequent real-time servo control increment for collecting the plurality of trace values in response to a setting of the record status flag and for transferring the collected trace values to the circular buffer portion of buffer memory pointed to by the buffer pointer variables,
    the programmed digital microcontroller including circuitry for retrieving and processing the plurality of trace values from the circular buffer portion and for generating a servo control loop correction value therefrom and for supplying the servo control loop correction value to the servo correction register during the background control increment.

* * * * *